UNITED STATES PATENT OFFICE.

WILLIAM McKEE, OF NEW YORK, N. Y., ASSIGNOR OF TWO-THIRDS TO MORITZ JACOBOWSKY AND MAX BOWSKY, OF NEW YORK, N. Y.

PROCESS OF MANUFACTURE OF ARTIFICIAL MARBLE FROM GYPSUM.

No. 886,064.     Specification of Letters Patent.     Patented April 28, 1908.

Application filed May 29, 1903. Serial No. 159,340.

*To all whom it may concern:*

Be it known that I, WILLIAM McKEE, of the city, county, and State of New York, have invented a certain new and useful Process of Manufacture of Artificial Marble from Gypsum, of which the following is a full, clear, and exact specification.

My invention relates to the manufacture of ornamental and useful articles of stone, and consists of the hereinafter described process of manufacture of such articles of gypsum and then subjecting them to a treatment, whereby the composition and qualities of this naturally soft material are changed, and the same is, for all practical purposes and in respect to all its characteristic properties, converted into marble.

In practicing my invention, I proceed as follows:—A block of gypsum of suitable size is cut, carved or otherwise shaped into the form which the desired article is to have. This may be done by such tools as are ordinarily used in wood-working, gypsum being approximately as soft and sometimes even softer than woods of the kinds as are used by wood carvers. The article, finished in its form and shape, is set into an oven or into a drying chamber, and there exposed to a heat from 200 to 225° F., for not less than twelve and not necessarily more than forty-eight hours. The length of time for which the article is to be exposed to this heat,—"baked" as I designate it—depends to some extent on the character of the gypsum but mainly upon the dimensions of the article. A more bulky article will require a longer baking, and so will an article made of gypsum of a heavier grade. Each piece or article must be heated throughout, evenly, and then continued to be exposed to the action of the heat of uniform intensity for at least nine hours longer. By this I mean to say that after the article is thoroughly penetrated by the heat, or in other words, uniformly heated throughout its entire body, which, according to the composition of the gypsum and the dimensions of the article, may require a longer or shorter time, the baking is to be continued for at least nine hours more, but not necessarily longer than thirty-six hours. Though a longer exposure to the heat should be avoided, being detrimental to the success, it is safer to bake longer than not to bake it long enough. After the baking the article is allowed to cool and then treated in a solution of approximately equal parts, measured dry by weight, of aluminum sulfate, potassium hydroxid, and sal soda. The proportionate quantities of the salts may be moderately varied, and particularly, when a greater degree of hardness is desired to be imparted to the product of the process, a larger proportionate quantity, not exceeding one-sixth of the stated quantity of sulfate of aluminum may be used. The salts are dissolved in soft or distilled water, approximately one half pound of each of the stated ingredients being taken to one gallon of water.

The water may be heated to facilitate a more complete and rapid dissolving of the salts, but it is not necessary to keep it hot for the treatment of the gypsum. The solution may be used warm or cold, but care must be taken that the article treated is completely immersed and kept in the solution until the saturation of the substance is as thorough as the heating of the article during the preceding period. The treatment of the article in the bath completes the transformation of the substance of the gypsum throughout the entire body of the article. The bath renders it hard and in all respects like marble. Its physical properties and chemical composition are changed. It is capable of receiving and retaining polish the same as marble, and even in a higher degree. After the treatment in the bath, the article is allowed to dry, and then its surfaces are polished. This polishing or otherwise finishing of the article is done in the same manner as articles of marble are finished.

In the finished article, the veins appear in marked and clearly visible lines, the same as upon marble, and to all practical purposes, and in all respects, the substance of the finished product is the same as natural marble.

If any particular coloring is desired, this might be applied when the article is treated in the liquid bath. This coloring process is a separate invention and independent of the process herein described, and therefore forms no part of this application.

The advantage of the herein described process is the great saving in labor in manufacture of such articles of virtu, ornaments, statuary, building materials, etc., as are required to be or are usually produced of marble. While slow and tedious work and the greatest care are required in producing delicate parts of ornaments of natural marble, the same work may be accomplished by the process hereinbefore described, with such machinery and tools as are ordinarily used in wood-working. The articles, thus produced, when treated as herein described, are in every respect equal to any produced from natural marble. Moreover, while in working the marble, large quantities of material must often be discarded on account of defect in color or composition, and larger pieces of marble works are rendered extremely expensive on account of the difficulty of obtaining blocks of marble of such dimensions as the work requires, of uniform composition, by the use of the herein described process, any article of any size may be produced. Such article, when finished, is absolutely homogeneous in composition, harmonious in color and in the marking of its veins.

I claim as my invention:—

1. The hereinbefore described process of indurating gypsum, consisting of the following steps: first, subjecting it to dry heat of from 200° to 225° F. until heated throughout; second, saturating it by an aqueous solution of aluminum sulfate, potassium hydroxid, and sal soda; and third, evaporating the surplus water not assimilated in the process.

2. The hereinbefore described process of indurating gypsum, consisting of the following steps: first, subjecting it to dry heat of from 200° to 225° F. until heated throughout; second, saturating it by a solution of approximately equal parts, measured dry by weight, of aluminum sulfate, potassium hydroxid and sal soda, approximately half a pound of each to one gallon of water; and third, driving off the surplus water, not consumed by the process.

WILLIAM McKEE.

Witnesses:
  HENRY SCHREITER,
  M. A. HELMKE.